United States Patent
Godlove et al.

(10) Patent No.: US 11,823,088 B1
(45) Date of Patent: Nov. 21, 2023

(54) SYSTEM AND METHOD FOR RETRIEVAL AND VERIFICATION OF NFT OWNERSHIP

(71) Applicant: Alchemy Insights, Inc., San Francisco, CA (US)

(72) Inventors: Benjamin Godlove, Arlington, VA (US); Ram Bhaskar, New York, NY (US); Niveda Krishnamoorthy, San Francisco, CA (US); Bill Zhu, San Francisco, CA (US); Alex Miao, San Francisco, CA (US); Omar Ceja, San Francisco, CA (US); Josh Zhang, New York, NY (US); Andrew Yang, New York, NY (US)

(73) Assignee: Alchemy Insights, Inc., San Francisco, CA (US)

( * ) Notice: Subject to any disclaimer, the term of this patent is extended or adjusted under 35 U.S.C. 154(b) by 0 days.

(21) Appl. No.: 18/142,178

(22) Filed: May 2, 2023

Related U.S. Application Data

(62) Division of application No. 18/087,761, filed on Dec. 22, 2022.

(51) Int. Cl.
 *G06Q 20/36* (2012.01)
 *G06F 16/23* (2019.01)
 *G06Q 20/38* (2012.01)

(52) U.S. Cl.
 CPC ........... *G06Q 20/367* (2013.01); *G06F 16/23* (2019.01); *G06Q 20/389* (2013.01); *G06Q 2220/00* (2013.01)

(58) Field of Classification Search
 CPC ............... G06Q 20/367; G06Q 20/389; G06Q 2220/00; G06F 16/23
 See application file for complete search history.

(56) References Cited

U.S. PATENT DOCUMENTS

| 5,371,878 A | 12/1994 | Coker |
| 8,086,732 B1 | 12/2011 | Volz et al. |

(Continued)

FOREIGN PATENT DOCUMENTS

| CN | 109992993 A | 7/2019 |
| CN | 112150130 A | 12/2020 |

(Continued)

OTHER PUBLICATIONS

Leeway Hertz, How to Implement Caching Layers in Web3 Products, Sep. 22, 2022, productcoalition.com, https://productcoalition.com/how-to-implement-caching-layers-in-web3-products-feca245bc5c6 (Year: 2022).*

(Continued)

*Primary Examiner* — John W Hayes
*Assistant Examiner* — Yingying Zhou
(74) *Attorney, Agent, or Firm* — Carr & Ferrell LLP

(57) ABSTRACT

Systems and methods for fast and efficient retrieval of NFT ownership information are provided. An exemplary method includes initializing a mirror blockchain by making a copy of an NFT blockchain; initializing an ownership transaction table and an NFT ledger from a mirror NFT blockchain by processing the mirror blockchain from a beginning block to an end block; periodically update the mirror blockchain with new blocks from an NFT blockchain thereby forming a new end block; processing ownership transaction events that modify NFT ownership in the new blocks up to a fixed offset from the new end block; updating the ownership transaction table; updating the NFT ledger; receiving a request for all NFTs owned by a crypto-wallet address; generating a response with the NFTs owned by the crypto-wallet address from the NFT ledger; selecting an NFT group; and verifying the NFT ledger against the NFT blockchain ownership.

26 Claims, 7 Drawing Sheets

(56) References Cited

U.S. PATENT DOCUMENTS

| | | | |
|---|---|---|---|
| 8,554,929 B1 | 10/2013 | Szeto et al. | |
| 9,613,120 B1* | 4/2017 | Kharatishvili | G06F 16/2358 |
| 11,281,975 B1 | 3/2022 | Isaksson et al. | |
| 11,728,976 B1 | 8/2023 | Godlove et al. | |
| 11,750,711 B1 | 9/2023 | Philipson et al. | |
| 2008/0098349 A1 | 4/2008 | Lin et al. | |
| 2010/0293335 A1* | 11/2010 | Muthiah | G06F 12/0813 |
| | | | 711/E12.001 |
| 2011/0078705 A1 | 3/2011 | Maclinovsky | |
| 2011/0161488 A1 | 6/2011 | Anderson | |
| 2012/0310878 A1* | 12/2012 | Vuksan | G06F 16/248 |
| | | | 707/769 |
| 2016/0283348 A1 | 9/2016 | Golde et al. | |
| 2017/0091069 A1 | 3/2017 | Fujiwara et al. | |
| 2018/0089041 A1 | 3/2018 | Smith et al. | |
| 2018/0145836 A1 | 5/2018 | Saur et al. | |
| 2018/0198714 A1 | 7/2018 | Krieger | |
| 2018/0300227 A1 | 10/2018 | Bergen | |
| 2019/0171451 A1 | 6/2019 | Hardy et al. | |
| 2019/0251018 A1 | 8/2019 | Jin et al. | |
| 2020/0097953 A1 | 3/2020 | Islam et al. | |
| 2020/0183818 A1 | 6/2020 | Guenther et al. | |
| 2020/0233858 A1 | 7/2020 | Deng et al. | |
| 2020/0286026 A1 | 9/2020 | Dahod et al. | |
| 2020/0374113 A1 | 11/2020 | Noam et al. | |
| 2020/0396065 A1 | 12/2020 | Gutierrez-Sheris | |
| 2021/0067319 A1 | 3/2021 | Chung et al. | |
| 2021/0097484 A1 | 4/2021 | Ramos et al. | |
| 2021/0124730 A1 | 4/2021 | Kannan et al. | |
| 2021/0201328 A1 | 7/2021 | Gunther | |
| 2021/0240733 A1 | 8/2021 | Kramer et al. | |
| 2021/0263719 A1 | 8/2021 | Pai et al. | |
| 2021/0272075 A1 | 9/2021 | Adams et al. | |
| 2021/0304205 A1 | 9/2021 | Saka et al. | |
| 2021/0314154 A1 | 10/2021 | Husson et al. | |
| 2022/0004539 A1 | 1/2022 | De Caro et al. | |
| 2022/0027348 A1 | 1/2022 | Manevich et al. | |
| 2022/0027970 A1 | 1/2022 | Kim et al. | |
| 2022/0159069 A1 | 5/2022 | Shirley et al. | |
| 2022/0173893 A1* | 6/2022 | Basu | H04L 9/3255 |
| 2022/0318122 A1 | 10/2022 | Hughes et al. | |
| 2022/0335049 A1* | 10/2022 | Hacigumus | G06F 16/24573 |
| 2023/0098185 A1* | 3/2023 | Carver | H04L 9/0891 |
| | | | 707/703 |

FOREIGN PATENT DOCUMENTS

| | | |
|---|---|---|
| KR | 101796690 B1 | 11/2017 |
| WO | WO2020259352 A1 | 12/2020 |

OTHER PUBLICATIONS

Wang et al., Decentralized Caching for Content Delivery Based on blockchain: A Game Theoretic Perspective, Jan. 23, 2018, arxiv.org, https://arxiv.org/pdf/1801.07604.pdf (Year: 2018).*

Basu et al., Adaptive TTL-Based Caching for Content Delivery, Dec. 9, 2017, arxiv.org, https://arxiv.org/pdf/1704.04448.pdf (Year: 2017).*

Emmanuel Cecchet, Encyclopedia of Database Systems, 2009, Springer, pp. 1738-1743 (Year: 2009).*

Porru et al., "Blockchain-Oriented Software Engineering: Challenges and New Directions," IEEE—2017 IEEE/ACM 39th International Conference on Software Engineering Companion (ICSE-C), May 20-28, 2017, pp. 1-4.

Koul, Rohan, "Blockchain Oriented Software Testing—Challenges and Approaches", IEEE, 2018 3rd International Conference for Convergence in Technology (I2CT), The Gateway Hotel, XION Complex, Wakad Road, Pune, India. Apr. 6-8, 2018, pp. 1-6.

Hertz, "How to Implement Caching Layers in Web3 Products", Sep. 22, 2022, productcoalition.com, https://productcoalition.com/how-to-implement-caching-layers-in-web3-products-feca245bc5c6, 6 pages.

Wang et al., "Decentralized Caching for Content Delivery Based on blockchain: A Game Theoretic Perspective", Jan. 23, 2018, arxiv.org, https://arxiv.org/pdf/1801.07604.pdf, 6 pages.

Basu et al., "Adaptive TTL-Based Caching for Content Delivery", Dec. 9, 2017, arxiv.org, https://arxiv.org/pdf/1704.04448.pdf, 27 pages.

Cecchet, "Encyclopedia of Database Systems", 2009, Springer, 212 pages.

* cited by examiner

SYSTEM AND METHOD FOR RETRIEVAL AND VERIFICATION OF NFT OWNERSHIP

CROSS-REFERENCE TO RELATED APPLICATIONS

The present utility patent application is a divisional application of U.S. patent application Ser. No. 18/087,761 filed Dec. 22, 2022 entitled "System and Method for High Performance Providing Fresh NFT Metadata." The present utility patent application is related to U.S. patent application Ser. No. 18/083,421, filed Dec. 16, 2022 entitled "Systems and Methods for Creating a Consistent Blockchain Including Block Commitment Determinations." The present utility patent application is also related to U.S. patent application Ser. No. 18/087,732, filed Dec. 22, 2022 entitled "Systems and Methods for Adaptively Rate Limiting Client Service Requests at a Blockchain Service Provider Platform" and U.S. patent application Ser. No. 18/087,746, filed Dec. 22, 2022 entitled "System and Method for Intelligent Testing of Blockchain Applications Using a Shadow System." The contents of each of these above-mentioned applications are incorporated herein by reference for all purposes to the extent that such subject matter is not inconsistent herewith or limiting hereof.

FIELD

The present application relates to computer systems and methods that provide applications efficient access to NFT metadata and ownership information.

BACKGROUND

It should not be assumed that any of the approaches described in this section qualify as prior art merely by virtue of their inclusion in this section.

For a user developing an NFT blockchain application, there is a need to access metadata related to nodes and NFTs on a blockchain. Further, given that there are multiple different types of blockchains and their associated standards, the data can be in formats difficult to process and need to be handled differently for each blockchain type. Decisions must be made on which blockchain node to access for a timely response to a request for metadata. Further, each node is likely at a different state with a different number of blocks in each chain. Determining the end block within a blockchain needs to be done with care when determining NFT ownership.

For the development of an NFT application, a developer will often need access to NFT metadata. One desired function is for an Application Programming Interface (API) that will return all the NFTs owned by a given crypto-wallet address. Another needed API function is to provide all or some of the metadata for an NFT.

The determination of all NFTs owned by a crypto-wallet can require a large amount of processing. What is needed is a simple, efficient, and timely way to get all NFTs owned by a wallet address and metadata associated with an NFT.

SUMMARY

This summary is provided to introduce a selection of concepts in a simplified form that are further described below in the Detailed Description of Example Embodiments. This summary is not intended to identify key features or essential features of the claimed subject matter, nor is it intended to be used as an aid in determining the scope of the claimed subject matter.

According to some embodiments, the present disclosure is directed to a method and system for accessing fresh NFT metadata. The metadata is accessed by first initializing a metadata cache with the metadata from a mirror blockchain. The mirror blockchain is a copy of an NFT blockchain, which is initialized from the network coupled NFT blockchain. An NFT blockchain is managed and updated by several geographically distributed blockchain servers. The method by which the blockchain is updated and kept consistent is beyond the scope of this patent but a person of ordinary skill in accessing an NFT blockchain would know how to access the NFT blockchain data. Periodically the mirror blockchain is updated with new blocks from the NFT blockchain. These new blocks are ingested from the mirror blockchain and processed to extract the metadata transaction events that incorporate NFT methods that implement metadata modifications. The metadata cache is updated with the metadata modifications. Next, parts of the metadata cache are validated, and updated if required, based on a means for adaptive verification. Then a user request for an NFT's metadata is received. The requested metadata is accessed from the metadata cache and generates a user response with the specific NFT metadata and a freshness indication.

In another embodiment, the method and system can include a method for efficiently accessing NFT ownership by a crypto-wallet address. Initially, an ownership transaction table is initialized from the blockchain. The ownership transaction table is used to initialize an NFT ledger. Periodically, new blocks from the blockchain are ingested for processing ownership information. Ownership transaction events are processed and used to update the NFT transaction table and the NFT ledger. A means for adaptive verification is used to check the freshness and validate the ownership information. A user request for ownership information is received and the ownership metadata is accessed from the NFT ledger and returned to the user.

BRIEF DESCRIPTION OF THE DRAWINGS

Exemplary embodiments are illustrated by way of example and not limited by the figures of the accompanying drawings, in which like references indicate similar elements.

DETAILED DESCRIPTION OF EXAMPLE EMBODIMENTS

Figure 1:
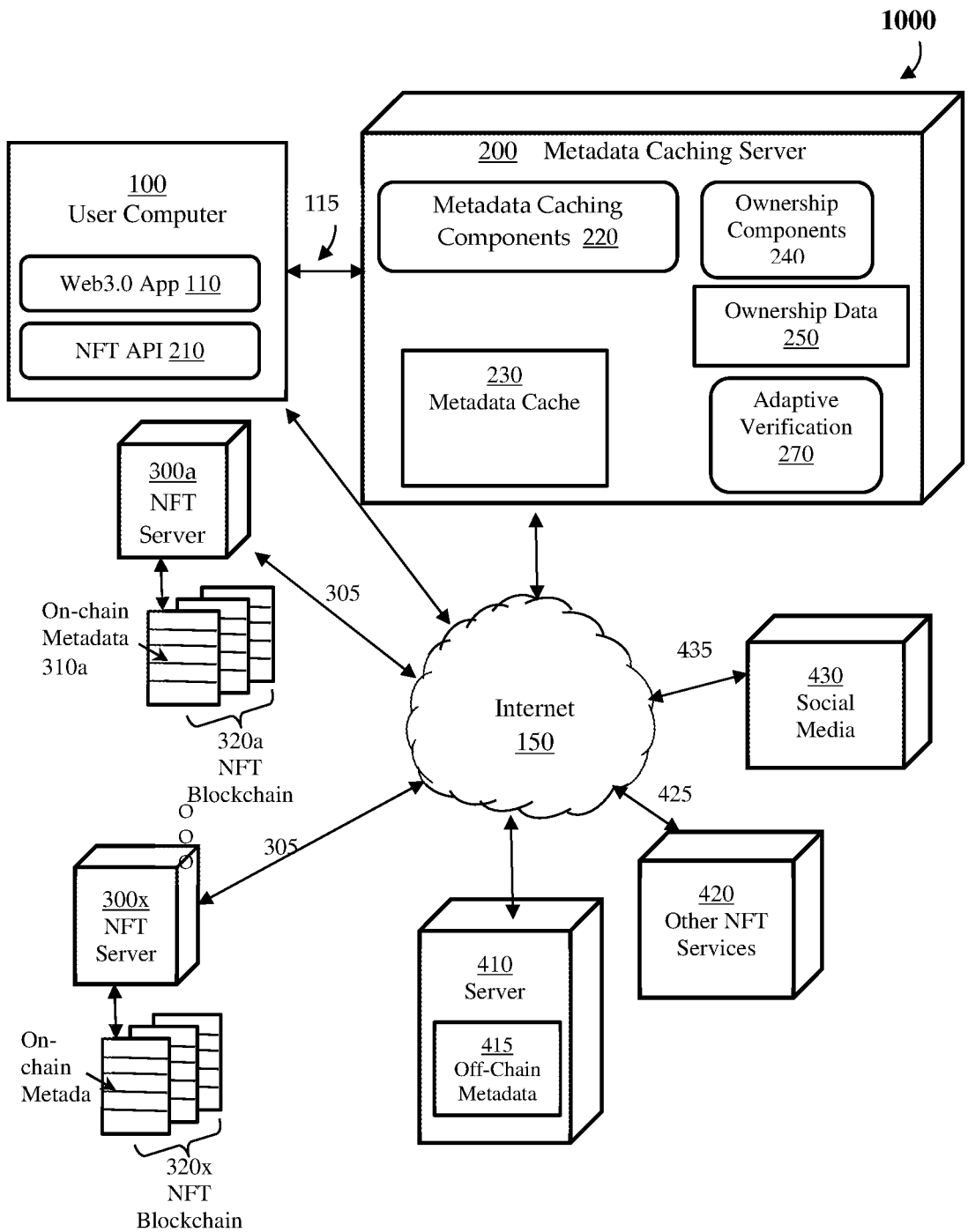
FIG. 1 is a block diagram showing an example system for efficiently providing fresh NFT metadata, including a ledger of NFT ownership.

The following detailed description includes references to the accompanying drawings, which are a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, functional, logical, and electrical changes can be made without departing from the scope of what is claimed. The following detailed description is, therefore, not to be taken in a limiting sense, and the scope is defined by the appended claims and their equivalents.

Overview

The following disclosure describes an abstraction layer for efficient and fresh access to Non-Fungible Tokens (NFTs) metadata and crypto-wallet ownership information. While token ownership can be considered NFT metadata, this disclosure includes details of a separate process for efficiently accessing information regarding all the NFT tokens owned by a crypto-wallet address. This abstraction layer can be in the form of an Application Programming Interface (API), but other means or interfaces for a user application to access NFT metadata are contemplated, including but not limited to function calls and remote procedure calls. For this disclosure, the term "metadata" refers to any data associated with an NFT, which can include NFT ownership data and off-chain data reference by an NFT.

An NFT can contain but is not limited to metadata including ownership, name, description, image or video data, a link to off-chain data, and attributes regarding the NFT. The Ethereum NFT blockchain is selected as a common example, but the principles described can apply to other types of NFT blockchains that support smart contracts. One of the challenges and inefficiencies of directly accessing NFT metadata from a blockchain node is that the blockchain comprises a list of transactions and events that include logs. However, much of this log or update data is not directly related to the NFT ownership or to changes in the NFT metadata. To access the current state of the metadata, all the blocks on the blockchain have to be parsed and deconstructed to remove information unrelated to the metadata or ownership and to further process the information that is related. This step requires significant time, processing power, and network bandwidth. Further, the metadata is often encoded in a format that might not be convenient for the application and requires an application developer to convert the metadata into a form that is more usable.

NFT Ownership Metadata

The Ethereum NFT blockchain is one example where the determination of all the NFTs owned by a crypto-wallet can take significant time and processing power. There are currently two common standards for Ethereum NFTs, ERC-721 and ERC-1155, which define methods for accessing NFT metadata, including information regarding ownership. There are also many more standards that are used for both Ethereum NFTs and NFTs based on other blockchain standards. These standards specify the methods that should be exposed by the NFT. In regards to ownership metadata, for ERC-721 the method "ownerOf( )" returns the wallet ID of the NFT owner. Thus, to determine the ownership of all the ERC-721 compliant NFTs, a user would have to interrogate every ERC-721 compliant NFT on a blockchain to determine if the NFT is owned by a specific crypto-wallet address.

NFTs compliant with ERC-1155 have a different method with respect to identifying an NFT owner. The method exposed by ERC-1155 uses the function which is given a wallet ID as an input to a "balanceOf( )" method. If the method returns a non-zero value, that indicates ownership of the supplied wallet ID. The use of wallet ID and crypto-wallet address are equivalent.

Of note, if an application wants to know all of the NFT contracts owned by a wallet address, there would have to be a call to ownerOf( ) and balanceOf( ) for every single contract on Ethereum. Currently, there are over 150,000 NFT contracts and millions of crypto wallets. This approach would be very time-consuming and computationally expensive.

System Diagrams

Referring to FIG. 1, one embodiment of a system 1000 is shown that provides efficient and fresh responses to application inquiries for NFT metadata and which NFTs are owned by a crypto-wallet address. The system is comprised of a user computer 100, a Metadata Caching Server (MCS) 200, a network-coupled NFT compatible blockchain system (referred to herein as NFT server 300$a$-$x$), a server 410 with off-chain NFT metadata 415. The system can also include other NFT services 420, which can be used in validating the metadata cache 230 and ownership data 250. Additionally, the system can include a social media server 430 where information on social media services can be used as an indication that some NFTs are no longer fresh and need to be updated. These components can communicate through a network 150, which can include the Internet, cellular networks, or any other wired or wireless communication network.

The user computer 100 can include an application 110. To access NFT metadata, the application 110 can make calls to the NFT API 210 component. The NFT API 210 can access the Metadata Caching Server 200 either through a direct connection 115 or through a connection with a network 150. Alternatively, the application 110 could use remote procedure calls to access metadata and ownership functions on the Metadata Caching Server 200.

The Metadata Caching Server 200 provides application 110 with quick access to fresh NFT metadata in a processing efficient manner. The MCS 200 is comprised of NFT metadata caching software components 220 and NFT ownership software components 240. The MCS 200 also includes metadata cache 230 for storing metadata for quick access by the metadata caching software components 220. The metadata cache 230 can include both on-chain metadata 310$a$-$x$ and off-chain metadata 415.

The NFT blockchain consists of several instances of the NFT blockchain 320$a$-$x$, each of which is being updated and is checked against each other for consistency. Thus, the end of each NFT blockchain 320$a$-$x$ varies over time. A block added to one of the blockchains may be removed if it is not validated. Determining which node in the blockchain has the freshest data is one of the functions of the NFT metadata caching software components 220. For the ownership metadata, the ownership software components 240 will only process the blockchain up to the last few blocks (3-10 blocks). The prevention of ownership errors being provided to the user computers 100 is very important. Thus, the offset from the end of the chain is chosen because these blocks are very unlikely to change. A block change may occur if there is a disagreement between the blockchain nodes. After a period, these blockchain differences will be worked out, and the NFT node blockchain will become consistent. If a request for wallet ownership information is received, then the ownership software components 240 will quickly process ownership information in the blocks occurring from the offset to the end of the blockchain. This provides the application 110 with a consistent result while eliminating the chance of corrupting the ownership data.

The metadata caching software component 220 ingests from the mirror blockchain transaction events that modify an NFTs' metadata. These transaction events are generated by methods defined in an NFT contract. This metadata is read from an NFT server 300*a-x*. Preferably, blockchain transactions are ingested up to a block deemed to be fresh and are not likely to change because of forks in a blockchain. For transactions that change an NFT's metadata, metadata from the changed NFT up to the freshest block is stored in the metadata cache 230, specifically the on-chain metadata cache 232 (FIG. 2) If the transaction indicates a change to the off-chain metadata cache 234 (FIG. 2), this data can be read and stored in the off-chain metadata cache 234. Off-chain metadata 415 can include images or video clips but other types of data are included. The off-chain metadata 415 can be stored on a server 410 accessible by the MCS 200 over the Internet/Network 150. If the blockchain transaction involves a change in NFT ownership, the transaction can be sent to the ownership software component 240. If the blockchain transaction involves a change in an NFT's metadata, the metadata cache 230 is updated.

The adaptive verification module 270 is designed to refresh cached metadata 235 and ownership data 250 that might have become stale or be incorrect. The adaptive verification, described further below, utilizes external information to check for stale metadata.

The ownership software components 240 provides information on which NFTs are owned by which crypto-wallets. More information regarding this ownership software component 240 and the associated data structures are provided in FIG. 2 and the discussion thereof.

The NFT Servers 300*a-x* are NFT blockchain nodes managing their respective NFT blockchain 320*a-x* located at geographically separate locations. These blocks contain transaction logs that can change NFT metadata and NFT ownership. Metadata stored within blocks on the NFT blockchain 320*a-x* is referred to as on-chain metadata 310*a-x*. While the Ethereum blockchain is used as an example, these NFT nodes can be any blockchain where the tokens support contracts that support executable code.

Example Ethereum transaction methods indicating a change in the metadata of a token, a set of tokens, or the entire contract are "setURI( )," setTokenURI( ), and "set-BaseURI( )" These transactions are seen on a node because transactions are a basic building block of a blockchain. When these methods are ingested, a change to an NFT's metadata can be seen. Then the metadata server can go out and read the NFT's metadata and update the cache. Other examples of methods include "Reveal( )" which takes a set of NFT Ids. For example, the new NFT Ids would show a change in an image (e.g., off-chain metadata 415), which may be located on a remote server 410 accessible over the Internet 150.

Figure 2A:
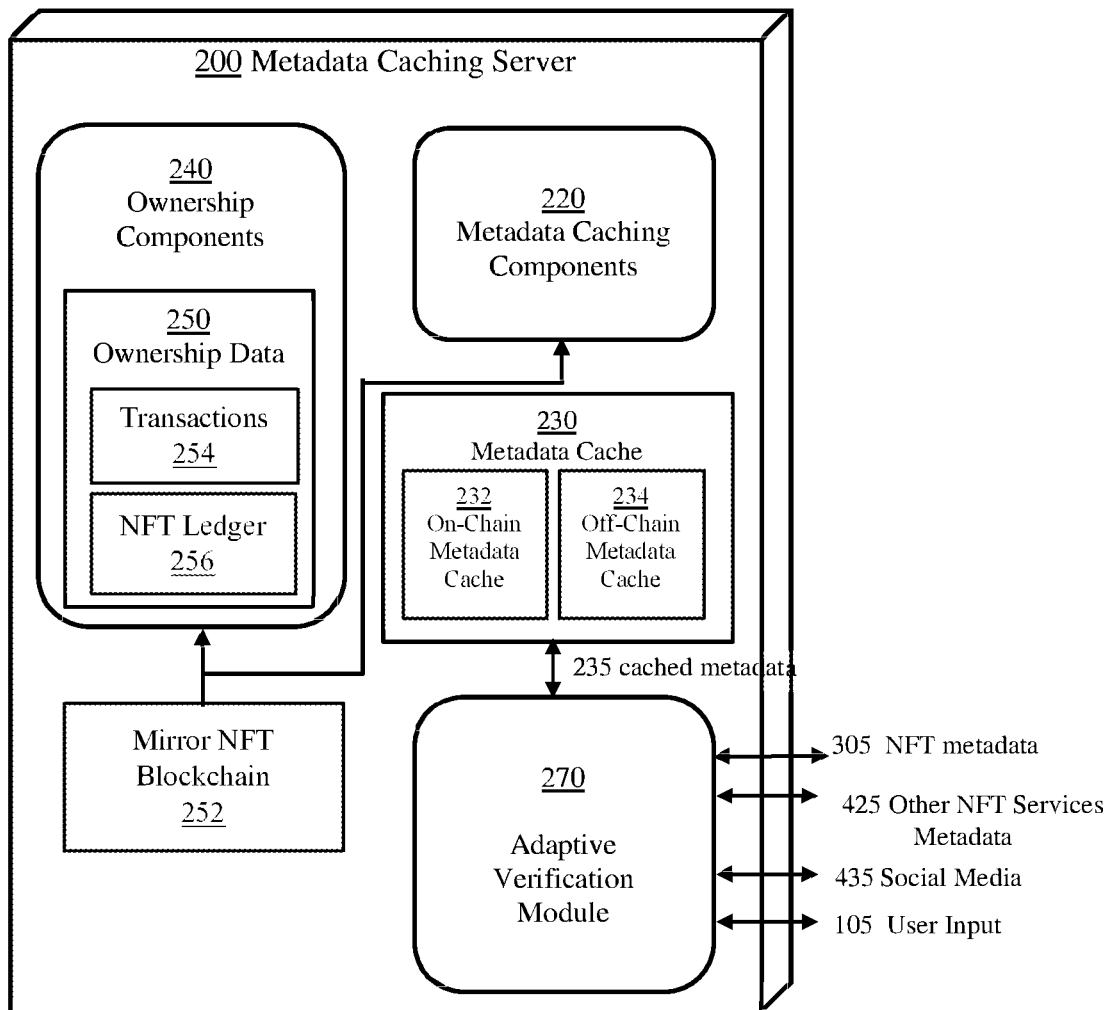
FIG. 2A is an expanded block diagram of an embodiment of a Metadata Caching Server.

Referring to FIG. 2, a more detailed view of the Metadata Caching Server 200 data components is provided. The metadata cache 230 can contain an on-chain metadata cache 232 and an off-chain metadata cache 234. On-chain metadata includes metadata 310*a-x* found within blocks on the NFT blockchain 320*a-x*. The off-chain metadata cache 234 caches data referenced within an NFT but is found on a server that can be located anywhere on the Internet. As shown in FIG. 1, the server 410 stores and provides access to the off-chain metadata 415.

The mirror NFT blockchain 252 is a copy of the NFT blockchain 320*a-x*. The mirror NFT blockchain 252 can be used by both the metadata caching software components 220 and the ownership software components 240. The mirror NFT blockchain 252 is periodically updated from the NFT blockchain 320*a-x* because new blocks are being added each minute to the NFT blockchain 320*a-x*. Preferably, the mirror NFT blockchain 252 is updated at least once a minute. However, shorter times down to twenty seconds and longer times of up to five minutes are contemplated for the periodic update.

The ownership data 250 includes a transactions data structure 254, and an NFT ledger 256. During the initialization of the transactions data structure 254 and the NFT Ledger 256, the mirror NFT blockchain 252 is processed from the first block to the end of the mirror NFT blockchain 252 to identify transactions that change the NFT ownership. A person of ordinary skill in the art of generated blockchain software would know how to identify transactions that change NFT ownership. From the transactions data structure 254, an NFT ledger 256 can be generated. The NFT ledger 256 provides for each the crypto-wallet address, all the NFTs owned by that wallet address. The NFT ledger 256 can also provide for an NFT address, the wallet address that owns that NFT. For the Ethereum blockchain, an NFT address is a combination of a contract address on the NFT blockchain and an NFT number.

Means for Adaptive Verification

The adaptive verification module 270 can use various techniques and external data to improve the freshness of the cached metadata, which can include ownership information. Freshness is the concept that the cached data being provided is the same as what a user would receive if the metadata was read from the NFT blockchain 320*a-x*. Because the MCS 200 can provide responses to a user computer 100 within a requested time frame, metadata returned may be from a cache that has not been updated as recently as needed. Thus, a freshness indicator can indicate whether the requested metadata has been updated or is potentially stale.

An NFT's metadata can become stale or not fresh for several reasons, one of which is bad behavior by an NFT contract that does not follow the standards. A badly behaved NFT contract can have code that makes changes to its metadata without the changes being reflected in an emitted blockchain transaction, and thus the metadata cache does not get updated by the MCS 200 when processing new blockchain blocks. Another cause of stale metadata is that off-chain metadata can be changed without a transaction notification on the blockchain. Further, an update may fail if an NFT server 300*a-x* is busy or a server 410 with off-chain metadata 415 is busy and cannot provide a timely response. The adaptive verification techniques will verify the cached metadata against the blockchain metadata and off-chain metadata and update the cache if required. Further, the adaptive verification techniques can adjust the frequency at which checks are made and which metadata, NFTs, or groups of NFTs are checked based on the errors found.

One means for adaptive verification uses an adaptive learning algorithm to check the NFT metadata cache 230 against the NFT metadata 305. The check can be performed randomly or systematically against all the NFTs. Alternatively, the NFT adaptive verification can be limited to a class of NFTs that are suspect. The learning algorithm will adapt to an optimal frequency of checking the freshness of the metadata. A person having ordinary skill in the art (POSITA) of adaptive learning and artificial intelligence programming would know how to program and configure an adaptive learning algorithm for this goal. The algorithm would learn which NFTs are most likely to have an error between the metadata cache 230 and the NFT blockchain 320*a-x* and require a more frequent refresh of the metadata. This increases the freshness of the metadata and ownership information being provided to a user computer 100.

Figure 2B:
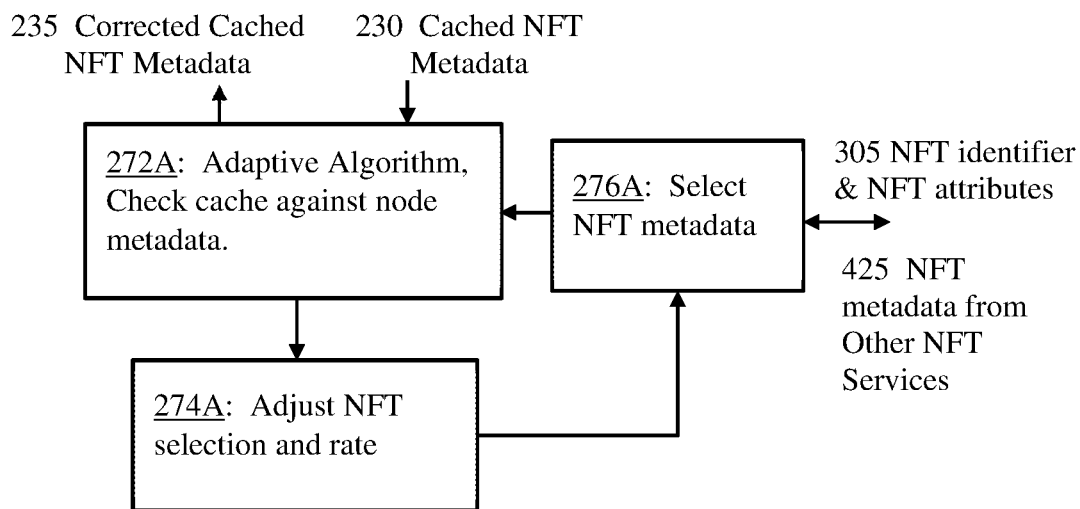
FIG. 2B, 2C are block diagrams of one embodiment of the adaptive verification of cached metadata according to one embodiment.

FIG. 2B is a block diagram of adaptive verification module 270, an embodiment of a means for adaptive verification. Within this adaptive verification module 270, a component 276A requests and receives NFT metadata 305 from an NFT server 300a-x (FIG. 1), or NFT metadata 425 (FIG. 1) from a network attached to other NFT services 420 (FIG. 1) that provides metadata. The NFTs can be chosen at random or systematically from all the NFTs. The NFTs selected for checking can be by different methods and groupings. One such grouping would be by NFTs in the same blockchain contract, or NFTs with the same attributes or characteristics. Another grouping could be NFTs that previously had metadata discrepancies.

The received NFT metadata 305, or received NFT metadata 425 from other NFT services 420, or a combination thereof and the corresponding NFT metadata cache 230 are used to train a learning algorithm in the adaptive algorithm component 272A. The learning algorithm can be in the form of a neural network or other learning algorithm. If the NFT metadata cache 230 does not match the received metadata, then the metadata cache 230 is updated.

The component 274A can adjust the frequency of NFT sampling for either all the NFTs, a group of NFTs, or for just the NFTs that previously had metadata discrepancies. In one embodiment, if there are more than a threshold number of metadata discrepancies within a contract, then all of the NFTs within a contract are updated. The adaptive algorithm component 272A (FIG. 2B) accesses the metadata from the NFT servers 300a-x (FIG. 1), the other NFT service 420, or a combination thereof.

Another means for adaptive verification technique provides a "time-to-live" on some or all of the NFTs based on an NFT classification, attribute, characteristic, NFT groups or a combination thereof. The groups can be as previously described above including all the NFTs, NFTs in a contract, and groups of NFTs that had previous metadata discrepancies. After an NFT group in the metadata cache for a time period, the NFT having a specified classification, attribute, or characteristic, the NFT group reaches the time-to-live and is updated. The time to live can vary between NFT groups or NFT classification, attribute, or characteristic. The time-to-live can be from an hour to one or more weeks. For example, an NFT graphic picture that had a high purchase price may infrequently change and thus would only need to be refreshed infrequently. Where an NFT metadata is related to a game, the NFT may have metadata that frequently changes. Adjustments to the time to live can increase when more discrepancies are found and be reduced when fewer discrepancies are found. These adjustments can be made independently based on the attributes of a group of NFTs or an individual NFT.

Another means for adaptive verification can be input from other NFT Services 420. Other connected NFT services 420 via the Internet 150 can provide similar metadata information. The external metadata can be used to verify the metadata in the metadata cache 230. An adaptive algorithm component 272A can be configured to compare the cached metadata 235, the metadata requested from other NFT services 420, and the NFT metadata 305 to learn which NFTs are not fresh and need to be refreshed more often.

Figure 2C:
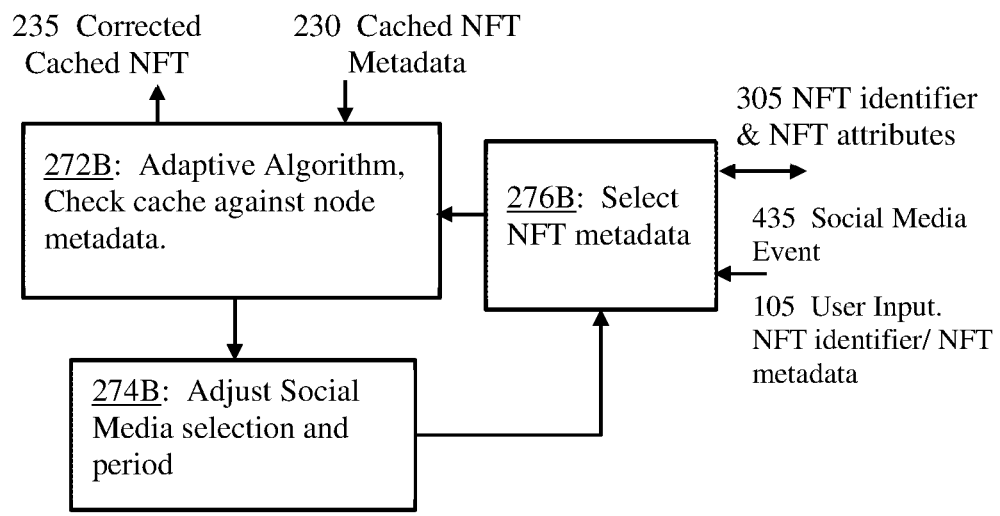

Another means for adaptive verification is shown in the block diagram shown in FIG. 2C. The input can be external events input to the system. These events include a user input 105 generated by a user. A user may note that a change in an NFT metadata or change in ownership is not reflected when accessed through the application 110 or any other method by which a user could access the services of the Metadata Caching Server 200. In this embodiment, the user computer 100 through the NFT API 210 can input a message indicating the discrepancy that is sent to the MCS 200. This input can include NFT identifying information. The other information received can be a social media event or notification 435. An example of this event could be a release of a new version of game software that could affect some of the NFTs on the blockchain.

These events are received as messages and processed by the select NFT metadata component 276B. This component receives the social media event or notification 435 and user input 105. Based on the NFT identified by these inputs, the component 276B requests and accesses the NFT data on the NFT Server's 300a-x NFT blockchain 320a-x. An adaptive algorithm component 272B receives the NFTs metadata related to the social media event, the user input, or a combination thereof and compares the metadata for these NFTs with the cached metadata 235. The adaptive algorithm can learn whether any discrepancies are likely to happen or whether a specific social media event or user input is likely not to have a discrepancy. A select NFT metadata component 274B can adjust the frequency that the user input 105 or social media event 435 is processed. Further, the NFTs associated with these events can be added to a list of NFTs that are periodically and adaptively checked.

Metadata Caching Method

Figure 3A:
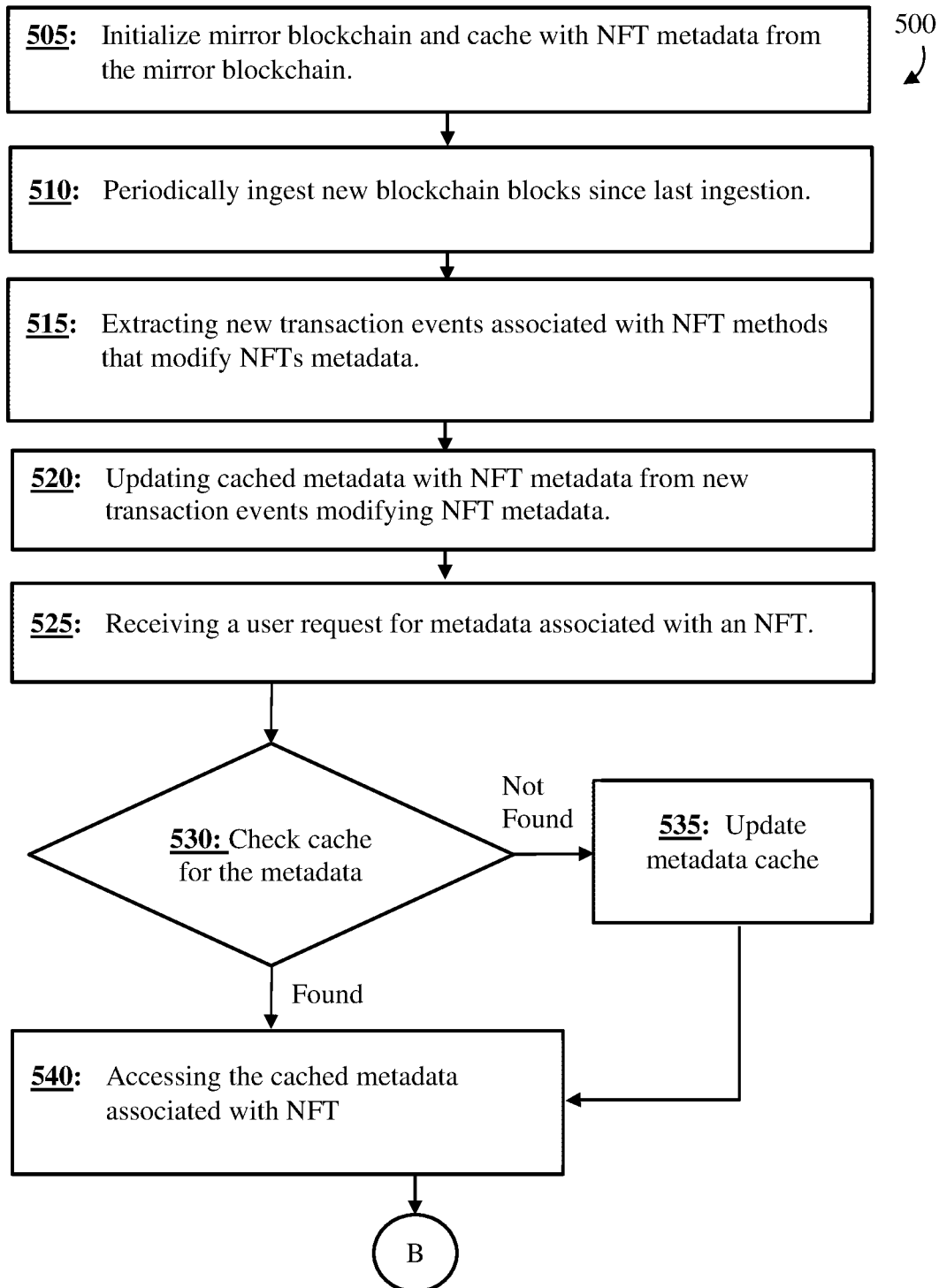
FIG. 3A, 3B are a flow diagram of a method of caching NFT metadata according to an example embodiment.

Referring to FIG. 3A, a flowchart of a method 500 of providing caching NFT metadata for quick and efficient access, is shown and described. In step 505, the mirror NFT blockchain 252 and metadata cache 230 are initialized. The initialization of the mirror NFT blockchain 252 is provided by accessing one or more NFT servers 300a-x through the network 150. Copies of all the NFT blockchain blocks are requested and copied into the mirror NFT blockchain 252. For the Ethereum blockchain, this can be over two terabytes of data. This mirror NFT blockchain 252 is processed from the first block to the last block. The last block can be referred to as the end of the blockchain. The processing finds all the NFTs added to the blockchain, and the metadata associated with the NFT is added to the metadata cache and associated with its NFT. The caching can include the off-chain metadata 415 reference by an NFT. This off-chain metadata 415 can be read from a network-coupled device (such as server 410) and cached by the MCS 200.

In step 510, new blocks that have been added to the NFT blockchain 320a-x are accessed and added to the mirror NFT blockchain 252. Blockchains like Ethereum update these blocks about every fifteen seconds. These are full blocks that are compliant with the blockchain standard. This step runs periodically and could be a background process that keeps the mirror NFT blockchain 252 substantially up to date with the NFT blockchain. Preferably, the mirror NFT blockchain 252 is updated as often as the NFT blockchain is updated. Though, to reduce the processing load, the update period can be longer. However, a longer update period could cause the metadata cache 230 to be less fresh.

In step 515, the new NFT blocks are processed. The processing examines each new block on the mirror NFT blockchain 252 from oldest to newest. The block log is processed for transactions emitted by methods specified by the executable code in the NFT. As disclosed above, functions such as "setURI" change the metadata for an NFT. The processing takes any of the changed metadata and updates the metadata cache 230.

Figure 4:
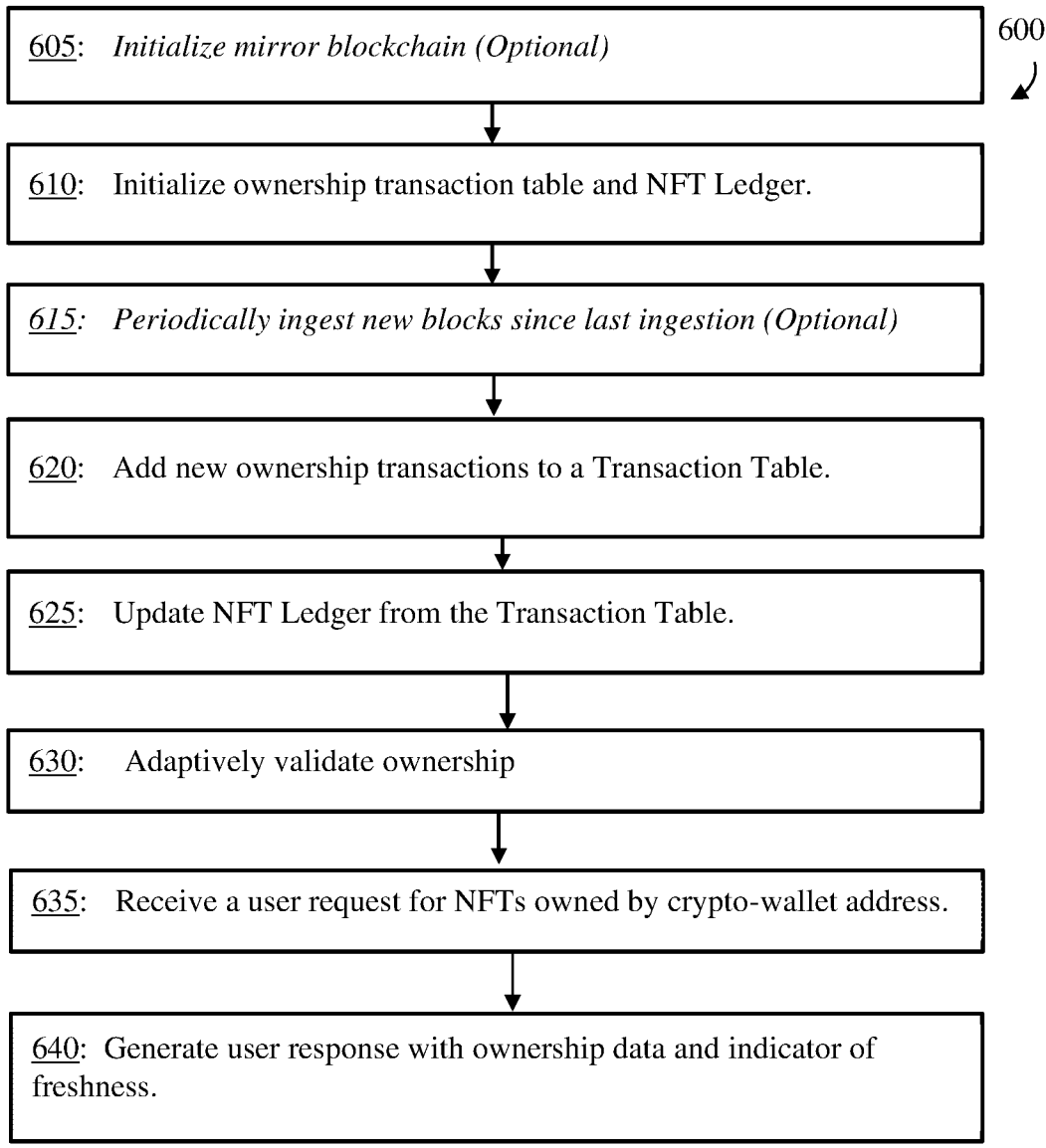
FIG. 4 is a flow diagram of an example method of caching NFT ownership metadata according to an example embodiment.

Additionally, the processing of the new blocks can identify transactions that alter the NFT ownership. This data includes a user crypto-wallet address and the change in NFT ownership. This data can be sent to another method or process for handling ownership information. An exemplary method for handling ownership data is shown in FIG. 4 and is described later on below.

In step 520, the cache is updated with the modified metadata. If there is an indication that the changed metadata is off-chain metadata, then this metadata is accessed over the Internet 150 from a remote server 410. In some embodiments, the off-chain metadata 415 is not cached and is accessed each time the data is requested.

In step 525, a user request is received from a user computer 100 for NFT on-chain metadata 310a-x. This request can include a crypto-wallet address. The request can be generated by an application which can make a call to an NFT API 210.

In step 530, the metadata cache 230 is checked for the requested metadata.

In step 535, if the metadata cache 230 does not have the requested metadata, then an attempt to update the metadata cache 230 with the requested metadata is made. The update of the cache can be subject to a time limitation. If the node server is overburdened for some reason, the request for metadata can fail or time out. This failure can be included in the response.

In step 540 the requested metadata associated with the NFT in the metadata cache 230 is accessed. If no response was received from the update in step 535, then accessed data could reflect a null field.

Figure 3B:
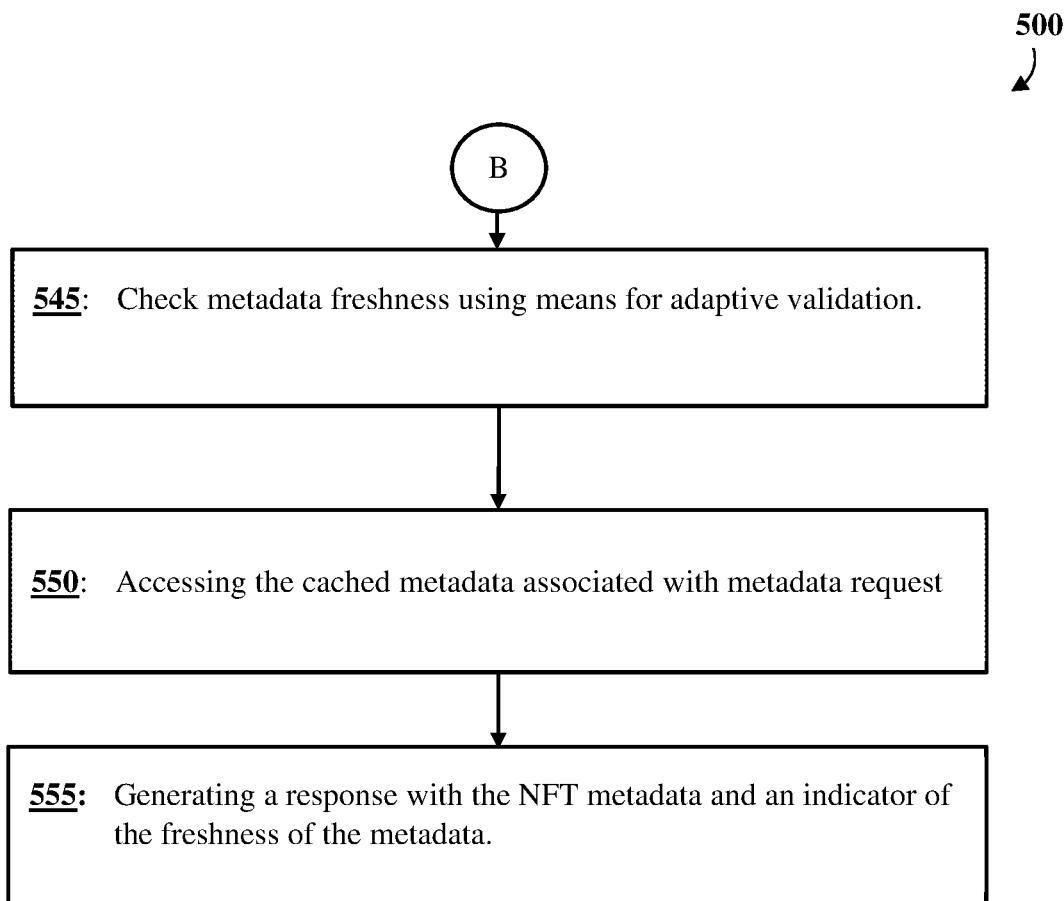

Referring to FIG. 3B, the flowchart of a method of providing caching NFT metadata for quick and efficient access is continued. In step 545, a check of metadata freshness is made using one of the means for adaptive validation techniques described above. Step 545 can be invoked by the user request for metadata, or this step can be a separate process that runs periodically and independently of a user request for metadata.

In step 550, the cache is accessed, and the metadata associated with the user request is returned. This cached metadata can have been updated by the adaptive verification step or process.

In step 555, a user response is generated with the requested NFT metadata and sent back to the user computer. This response can include indications of the freshness of the metadata.

NFT Ownership Access

Referring to FIG. 4, a flowchart for the process of providing NFT ownership information for a crypto-wallet address is provided. The process can be part of the method for providing cached NFT metadata. In another embodiment, the process can function independently.

In step 605, the mirror blockchain is initialized. If this method 600 is running in conjunction with the caching method disclosed in FIG. 3A, 3B, then this step is redundant and thus optional. As in step 505 (FIG. 3A), the initialization of the mirror NFT blockchain 252 is provided by accessing one or more NFT servers 300a-x through the network 150.

In step 610, the mirror blockchain is processed from the first block to the last block. Each block is processed to identify transactions that create NFT ownership and transactions that change NFT ownership. These transactions are saved in a transaction table. From this table, the transactions are processed to generate an NFT ledger. The NFT ledger can provide from an NFT identifier the crypto-wallet address that owns the NFT. Additionally, the NFT ledger can provide for a given crypto-wallet address all the NFTs owned by that wallet address. Also, the NFT ledger can provide for a given contract address, all the NFTs for that contract. Other types of ledger inquiries are contemplated by this invention including inquiries regarding NFTs with joint ownership, contracts with joint ownership, and NFTs that have changed ownership within a time window. The NFT ledger can include data structures for all of these mentioned features. A person of ordinary skill in database programming and generating data structures would be able to generate appropriate data structures for the transaction table and the NFT ledger, which can include data tables, data structures, or a database. Preferably, the data structures would support fast and efficient results for all of the above mentioned inquiries.

In step 615, new blocks that have been added to the NFT blockchain 320a-x are accessed and added to the mirror NFT blockchain 252. If this method is running in conjunction with the method in FIG. 3A, 3B, then this step is redundant and thus optional.

In step 620, the new blocks are ingested and processed for transactions that set NFT ownership or indicate changes in NFT ownership. Because of the importance of recording ownership correctly, the blockchain is not processed to the end block. This is done because any errors or forks in the blockchain will be corrected within a few blocks. After six new blocks on the blockchain, the block that is six blocks from the end of the chain has a high level of certainty of not changing. However, offsets from the head of the blockchain greater than sixty-four are contemplated. Off-sets up to sixty-four blocks can be used.

In step 625, the transaction table or data structure, database, or combination thereof is updated with any new ownership information or changes in ownership. The updated transaction table is used to update the NFT ledger. This can include a data structure for the crypto-wallet address for each NFT and a data structure for all NFTs owned by a crypto-wallet.

In step 630, a means for adaptive verification of ownership is performed. Ownership is a subset of NFT metadata, and thus the techniques described above for adaptive verification of NFT metadata disclosed above are equally applicable.

In step 635, a user request is received for ownership information. This request can originate from a user computer through an Application Programming Interface. The request can take different forms. One form of the request is for the crypto-wallet address for an NFT. In another form, the request can be for all the NFTs owned by a crypto-wallet address. For blockchains like Ethereum, a crypto-wallet address is the public crypto key in a public/private key encryption system.

In step 640, a user response is generated containing the ownership information requested. The response can include a freshness indicator. The generation of the response accesses the NFT ledger data structure, which can provide for a quick access to ownership information by NFT identifier or crypto-wallet address.

As mentioned above, it is important for the NFT ledger to not have errors, and thus the last few data blocks, between six to sixty-four, of the mirror blockchain are not ingested and processed for ownership information. However, to provide the best results back to a user, the generation of the ownership information request will process the mirror blockchain blocks to the end. Any ownership information related to the response will be used to provide an ownership response with the freshest metadata.

Computer System

Figure 5:
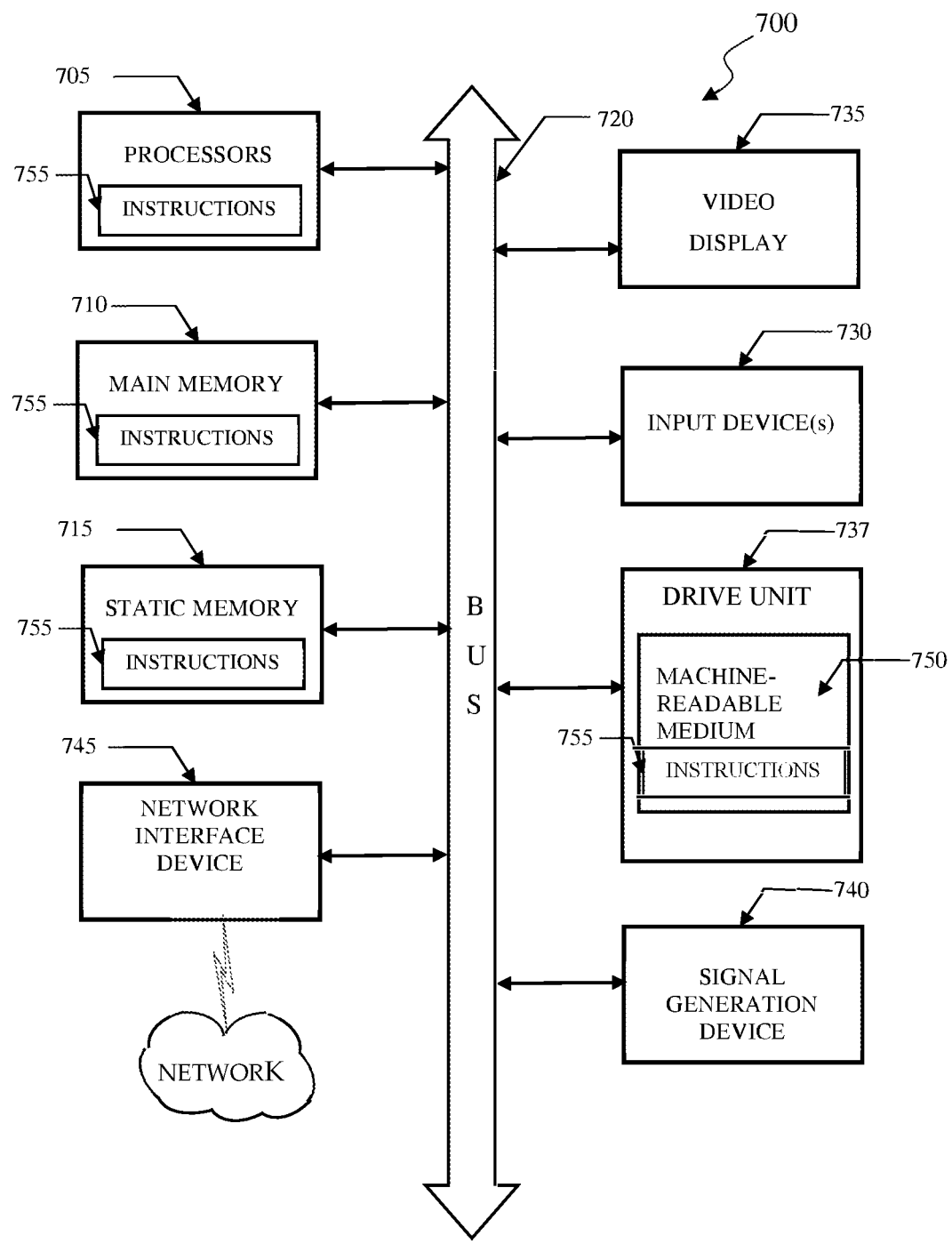
FIG. 5 is a simplified block diagram of a computing system, in accordance with some embodiments.

FIG. 5 is a diagrammatic representation of an example machine in the form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 705 (e.g., a central processing unit (CPU), a graphics processing unit (GPU), Digital Signal Processor, Neural Processor Unit (NPU) or any combination thereof), and a main memory 710 and static memory 715, which communicate with each other via a bus 720. The computer system 700 may further include a video display 735 (e.g., a liquid crystal display (LCD)). The computer system 700 may also include an alpha-numeric input device(s) 730 (e.g., a keyboard), a cursor control device (e.g., a mouse), a voice recognition or biometric verification unit (not shown), a drive unit 737 (also referred to as disk drive unit), a signal generation device 740 (e.g., a speaker), and a network interface device 745. The computer system 700 may further include a data encryption module (not shown) to encrypt data.

The drive unit 737 includes a computer or machine-readable medium 750 on which is stored one or more sets of instructions and data structures (e.g., instructions 755) embodying or utilizing any one or more of the methodologies or functions described herein. The instructions 755 may also reside, completely or at least partially, within the main memory 710 and/or within static memory 715 and/or within the processors 705 during execution thereof by the computer system 700. The main memory 710, static memory 715, and the processors 705 may also constitute machine-readable media.

The instructions 755 may further be transmitted or received over a network via the network interface device 745 utilizing any one of a number of well-known transfer protocols (e.g., Hyper Text Transfer Protocol (HTTP)). While the machine-readable medium 750 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read-only memory (ROM), and the like. The example embodiments described herein may be implemented in an operating environment comprising software installed on a computer, in hardware, or in a combination of software and hardware.

Not all components of the computer system 700 are required and thus portions of the computer system 700 can be removed if not needed, such as Input/Output (I/O) devices (e.g., input device(s) 730). One skilled in the art will recognize that the Internet service may be configured to provide Internet access to one or more computing devices that are coupled to the Internet service and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, section, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms, and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer method for fast and efficient retrieval of NFT ownership information and automatically and adaptively verifying the ownership, comprising:
    initializing a mirror blockchain by making a copy of an NFT blockchain;
    processing the mirror blockchain from a beginning block to an end block to identify transactions regarding NFT ownership;
    saving the transactions in an ownership transaction table;
    generating an NFT ledger by processing the transactions;
    periodically updating the mirror blockchain with new blocks from the NFT blockchain thereby forming a new end block;
    processing ownership transaction events that modify NFT ownership in the new blocks up to a fixed offset from the new end block;
    updating the ownership transaction table with the ownership transaction events;

updating the NFT ledger according to the ownership transaction events;
receiving a request from a user computer for all NFTs owned by a crypto-wallet address;
generating a response with the NFTs owned by the crypto-wallet address from the NFT ledger;
selecting an NFT group from the NFT ledger, the NFT group having an adaptively assigned time-to-live; and
verifying the NFT ledger against the NFT ownership, upon the NFT group's time-to-live expiring, the verifying comprising:
updating the time-to-live of the NFT group using a learning algorithm based on discrepancies between the NFT ledger and the NFT blockchain.

2. The method of claim 1, further comprising an Application Programming Interface (API) for providing the user computer access to the NFT ownership information.

3. The method of claim 1, wherein the fixed offset from the new end block is six blocks.

4. The method of claim 1, wherein the periodic update of the mirror blockchain is at least every twenty seconds.

5. The method of claim 1, wherein the verification of the ownership further includes a means for adaptive verification.

6. The method of claim 1, wherein processing ownership information in the mirror blockchain is from the fixed offset to the end block upon receiving a user computer request for ownership information and updating the response with any ownership changes in blocks from the fixed offset to the end block.

7. The method of claim 1, wherein initializing a mirror blockchain by making a copy of an NFT blockchain further comprises accessing one or more NFT servers through a network.

8. The method of claim 1, wherein the NFT ledger is configured to provide from an NFT identifier the crypto-wallet address that owns the NFTs.

9. The method of claim 1, wherein the NFT ledger is configured to provide all the NFTs for a contract.

10. A system for fast and efficient retrieval of NFT ownership information and automatically and adaptively verifying the ownership, the system comprising:
a processor; and
a memory communicatively coupled to the processor, the memory storing instructions executable by the processor to perform a method comprising:
initializing a mirror blockchain by making a copy of an NFT blockchain;
processing the mirror blockchain from a beginning block to an end block to identify transactions regarding NFT ownership;
saving the transactions in an ownership transaction table;
generating an NFT ledger by processing the transactions;
periodically updating the mirror blockchain with new blocks from the NFT blockchain thereby forming a new end block;
processing ownership transaction events that modify NFT ownership in the new blocks up to a fixed offset from the new end block;
updating the ownership transaction table with the ownership transaction events;
updating the NFT ledger according to the ownership transaction events;
receiving a request from a user computer for all NFTs owned by a crypto-wallet address;
generating a response with the NFTs owned by the crypto-wallet address from the NFT ledger;
selecting an NFT group from the NFT ledger, the NFT group having an adaptively assigned time-to-live; and
verifying the NFT ledger against the NFT ownership, upon the NFT group's time-to-live expiring, the verifying comprising:
updating the time-to-live of the NFT group using a learning algorithm based on discrepancies between the NFT ledger and the NFT blockchain.

11. The system of claim 10, further comprising an Application Programming Interface (API) for providing the user computer access to the NFT ownership information.

12. The system of claim 10, wherein the fixed offset from the new end block is six blocks.

13. The system of claim 10, wherein the periodic update of the mirror blockchain is at least every twenty seconds.

14. The system of claim 10, wherein the verification of the ownership further includes a means for adaptive verification.

15. The system of claim 10, wherein processing ownership information in the mirror blockchain is from the fixed offset to the end block upon receiving a user computer request for ownership information and updating the response with any ownership changes in blocks from the fixed offset to the end block.

16. The system of claim 10, wherein initializing a mirror blockchain by making a copy of an NFT blockchain further comprises accessing one or more NFT servers through a network.

17. The system of claim 10, wherein the NFT ledger is configured to provide from an NFT identifier the crypto-wallet address that owns the NFTs.

18. The system of claim 10, wherein the NFT ledger is configured to provide all the NFTs for a contract.

19. A non-transitory computer readable medium having embodied thereon instructions, which when executed by a processor, perform steps of a method for fast and efficient retrieval of NFT ownership information and automatically and adaptively verifying the ownership, the method comprising:
initializing a mirror blockchain by making a copy of an NFT blockchain;
processing the mirror blockchain from a beginning block to an end block to identify transactions regarding NFT ownership;
saving the transactions in an ownership transaction table;
generating an NFT ledger by processing the transactions;
periodically updating the mirror blockchain with new blocks from the NFT blockchain thereby forming a new end block;
processing ownership transaction events that modify NFT ownership in the new blocks up to a fixed offset from the new end block;
updating the ownership transaction table with the ownership transaction events;
updating the NFT ledger according to the ownership transaction events;
receiving a request from a user computer for all NFTs owned by a crypto-wallet address;
generating a response with the NFTs owned by the crypto-wallet address from the NFT ledger;
selecting an NFT group from the NFT ledger, the NFT group having an adaptively assigned time-to-live; and
verifying the NFT ledger against the NFT ownership, upon the NFT group's time-to-live expiring, the verifying comprising:

updating the time-to-live of the NFT group using a learning algorithm based on discrepancies between the NFT ledger and the NFT blockchain.

20. The non-transitory computer readable medium of claim 19, further comprising an Application Programming Interface (API) for providing the user computer access to the NFT ownership information.

21. The non-transitory computer readable medium of claim 19, wherein the fixed offset from the new end block is six blocks.

22. The non-transitory computer readable medium of claim 19, wherein the periodic update of the mirror blockchain is at least every twenty seconds.

23. The non-transitory computer readable medium of claim 19, wherein the verification of the ownership further includes a means for adaptive verification.

24. The non-transitory computer readable medium of claim 19, wherein processing ownership information in the mirror blockchain is from the fixed offset to the end block upon receiving a user computer request for ownership information and updating the response with any ownership changes in blocks from the fixed offset to the end block.

25. The non-transitory computer readable medium of claim 19, wherein initializing a mirror blockchain by making a copy of an NFT blockchain further comprises accessing one or more NFT servers through a network.

26. The non-transitory computer readable medium of claim 19, wherein the NFT ledger is configured to provide from an NFT identifier the crypto-wallet address that owns the NFTs.

* * * * *

UNITED STATES PATENT AND TRADEMARK OFFICE
CERTIFICATE OF CORRECTION

PATENT NO. : 11,823,088 B1
APPLICATION NO. : 18/142178
DATED : November 21, 2023
INVENTOR(S) : Benjamin Godlove et al.

It is certified that error appears in the above-identified patent and that said Letters Patent is hereby corrected as shown below:

In the Specification

In Column 7, Lines 39-40, the phrase "After an NFT group in the metadata cache for a time period..." should read "After an NFT group is in the metadata cache for a time period..."

Signed and Sealed this
Twenty-sixth Day of March, 2024

Katherine Kelly Vidal
*Director of the United States Patent and Trademark Office*